United States Patent [19]

Kurata et al.

[11] Patent Number: 4,505,574

[45] Date of Patent: Mar. 19, 1985

[54] COPYING MACHINE

[75] Inventors: Masami Kurata; Hiroyuki Saitoh; Masakane Matsuda, all of Kanagawa, Japan

[73] Assignee: Fuji Xerox Co., Ltd., Tokyo, Japan

[21] Appl. No.: 474,258

[22] Filed: Mar. 10, 1983

[30] Foreign Application Priority Data

Mar. 11, 1982 [JP] Japan .................................. 57-37287

[51] Int. Cl.³ ..................... G03G 15/00; G03B 27/52; G03B 27/34; G03B 29/00
[52] U.S. Cl. ............................... 355/14 E; 355/3 SH; 355/8; 355/14 R; 355/14 SH; 250/578; 250/557
[58] Field of Search ............... 355/13, 61, 14 E, 14 R, 355/14 SH, 8, 3 SH; 346/160; 250/557, 559, 560, 561, 562, 578; 358/285, 286, 287, 296; 372/101

[56] References Cited

U.S. PATENT DOCUMENTS

| | | | |
|---|---|---|---|
| 3,689,143 | 9/1972 | Case et al. | 355/8 X |
| 3,820,892 | 6/1974 | Boshet | 355/13 |
| 3,843,253 | 10/1974 | Mikan et al. | 355/13 X |
| 3,951,023 | 4/1976 | Ashburner | 355/13 X |
| 4,338,020 | 7/1982 | Yukawa et al. | 250/261 X |
| 4,436,416 | 3/1983 | Negoro et al. | 355/8 X |
| 4,460,270 | 7/1984 | Watai et al. | 355/14 E |

FOREIGN PATENT DOCUMENTS 68868  4/1982  Japan .................................. 355/14 C Primary Examiner—A. T. Grimley
Assistant Examiner—Terry Flower
Attorney, Agent, or Firm—Sughrue, Mion, Zinn, Macpeak, and Seas

[57] ABSTRACT

A copying machine includes sensors and logic circuitry for determining the size or presence of an original placed thereon. According to the size of the original, the scanning length and the size of the recording medium may be determined.

9 Claims, 6 Drawing Figures

COPYING MACHINE

BACKGROUND OF THE INVENTION

This invention relates to a copying machine in which the size of an original is detected, and recording control is carried out according to the original size thus detected.

Heretofore, whenever the size of an original has changed, the operator was required to select a recording sheet of suitable size therefor. Especially in the first copying operation with such a copying machine, sometimes one neglects to check the size of the recording sheets in the sheet supply tray, as a result of which data are copied on a recording sheet which is smaller, or unnecessarily larger in size. In such a case, the data must be re-recorded on a recording sheet of suitable size or the unnecessary part of the recording sheet must be cut off. This is uneconomical, and lowers clerical efficiency. Furthermore, in the same case, sometimes in reading picture data, the platen or the reading system is excessively moved to regions where no original is placed. Thus, the conventional copying machine suffers from a problem in that the reading operation is not efficient.

SUMMARY OF THE INVENTION

In view of the foregoing, an object of this invention is to provide a copying machine in which the size of the original is detected, and wherein recording control is carried out in conformance with the size thus detected.

The foregoing object and other objects of the invention has been achieved by the provision of a copying machine which comprises a transparent platen glass plate on which an original is placed; a platen cover for holding the original placed on the platen glass plate; sensors for detecting, at positions corresponding to predetermined points on the platen glass plate, whether or not light is transmitted between the platen glass plate and the platen cover; a logic circuit for identifying the size of the original on the platen glass plate from the outputs of the sensors; and control means for determining the size of an original scanning region or a recording sheet size according to the original size thus identified.

DETAILED DESCRIPTION OF THE PREFERRED EMBODIMENTS

Figure 1:
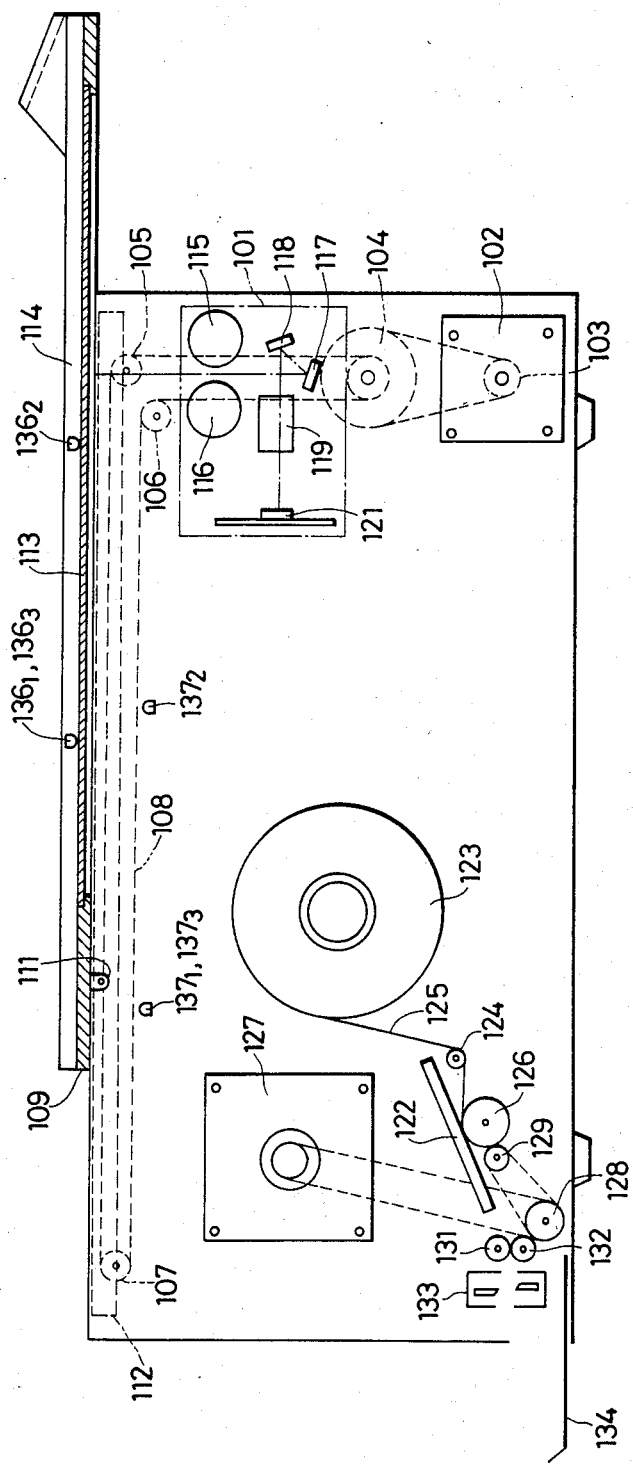
FIG. 1 is a side view illustrating the arrangement of a copying machine according to one embodiment of this invention.

FIG. 1 shows a copying machine of the type having a movable platen. The reading unit 101 of the copying machine 1 is fixedly positioned as illustrated. As a platen drive motor 102 is driven, the rotation of its rotary shaft is converted into the reciprocation of a wire 108 by means of pulleys 103 through 107. A metal fixing part 111 protruding from the bottom of a platen 109 is secured to a predetermined part of the wire 108. Therefore, as the wire 108 reciprocates, the platen 109 is reciprocated on rails 112. The platen 109 comprises a transparent glass plate, namely, a platen glass plate 113 inserted therein. An original is placed on the platen glass plate 113. A platen cover 114 for holding an original is provided on the platen 109 and the platen glass plate 113 in a manner such that it is freely opened and closed.

As the platen 109 is reciprocated, an irradiation region formed on the platen glass plate 113 by a pair of fluorescent lamps 115 and 116 moves in the direction of movement of the platen (or in the auxiliary scanning direction), so that the original thereon is continuously subjected to slit exposure. In this operation, the light beam reflected from the original is reflected by mirrors 117 and 118, concentrated by a lens 119, and reaches an image sensor 121, thus forming the image thereon. The image thus formed is converted into a picture signal by the image sensor 121 for each line.

The picture signal is binary-encoded and is then supplied, as a thermal head drive signal, to a thermal head 122. An elongated heat-sensitive sheet 125, having a width of 257 mm is supplied from a supply roll 123 through an idler roll 124 to the thermal head 122. The sheet 125 is pushed against the surface of the heat generating unit by a back roll 126. A heat-sensitive sheet conveying motor 127 rotates a drive roll 129, which is pushed against the back roller 126, through a pulley 128, so that a part of the heat sensitive sheet 125, which has been subjected to recording, is supplied to a pair of discharge rollers 131 and 132. The discharge rollers 131 and 132 operate to convey the recorded sheet to a discharge tray 134 through an automatic cutter 133. The automatic cutter 133 cuts the recorded sheet with the timing described later.

Three light emitting diodes $136_1$, $136_2$ and $136_3$ are arranged on the platen cover 114, while three photo-diodes $137_1$, $137_2$, $137_3$ are arranged inside the copying machine in manner such that they confront the light emitting diodes when the platen 109 is set at the reading start position.

Figure 2:
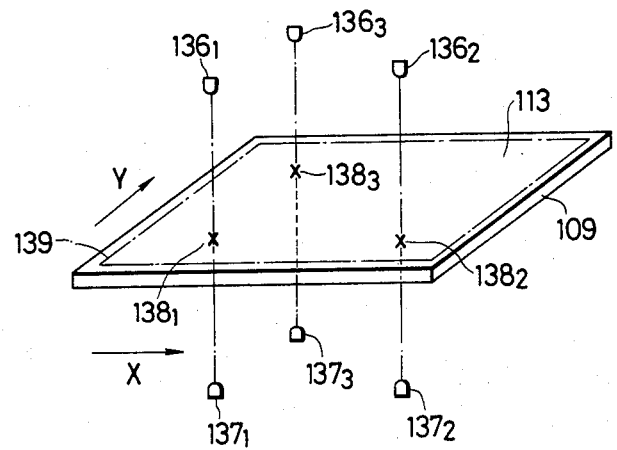
FIG. 2 is a perspective view showing the positional relation between sensors in the copying machine.

FIG. 2 shows the positional relation between the light emitting diodes and the photo-diodes with respect to the platen glass plate at the reading start position. The platen glass plate 113 is rectangular, 38 cm × 17 cm, so that an original of "B4" size at maximum can be placed on the plate 113. It is assumed that the light beam emitted by the first light emitting diode $136_1$ and received by the first photo-diode $137_1$ passes through a point $138_1$ on the platen glass plate 113. If one corner (the lower left corner in FIGS. 2 or 3) of the platen glass plate 113 is employed as the original point of an X-Y coordinate system, and the longitudinal direction of the platen glass plate is taken as the X-axis while the lateral direction perpendicular to the X-axis is taken as the Y-axis, then the coordinates of the point $138_1$ are as follows:

* Coordinates of the point $138_1$
X=7 cm, Y=5 cm

Figure 3:
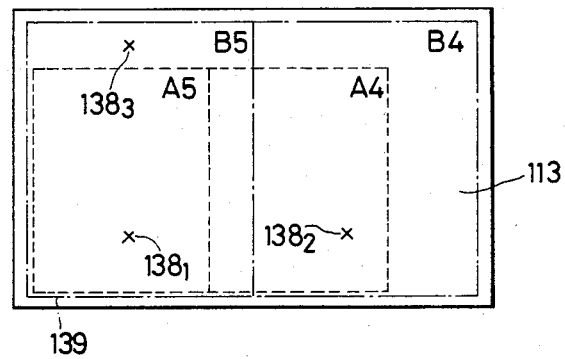
FIG. 3 is a plan view showing the relations among originals of different size and the detection points of the sensors.

Similarly, it is assumed that the light beams emitted by the second and third light emitting diodes $136_2$ and $136_3$ and received by the second and third photodiodes $137_2$ and $137_3$ pass through points $138_2$ and $138_3$ on the platen glass plate 113, respectively. In this case, the points $138_2$ and $138_3$ are arranged so that their coordinates are as follows:
* Coordinates of the point $138_2$
  X=24 cm, Y=5 cm
* Coordinates of the point $138_3$
  X=7 cm, Y=23 cm FIG. 3 shows the relationships between the three points $138_1$ through $138_3$ and the sizes of originals placed on the platen glass plate 113. When an original is set with its lower left corner placed at the corner 139 of the platen glass plate 113, the relationships between the sizes of originals and the optical detections of the photo-diodes $137_1$ through $137_3$ are as indicated by the following Table:

TABLE

| Photo-diode | Original Size | | | | |
|---|---|---|---|---|---|
| | B4 | A4 | B5 | A5 | No original |
| $137_1$ | No | No | No | No | Yes |
| $137_2$ | No | No | Yes | Yes | Yes |
| $137_3$ | No | Yes | No | Yes | Yes |

Figure 4:
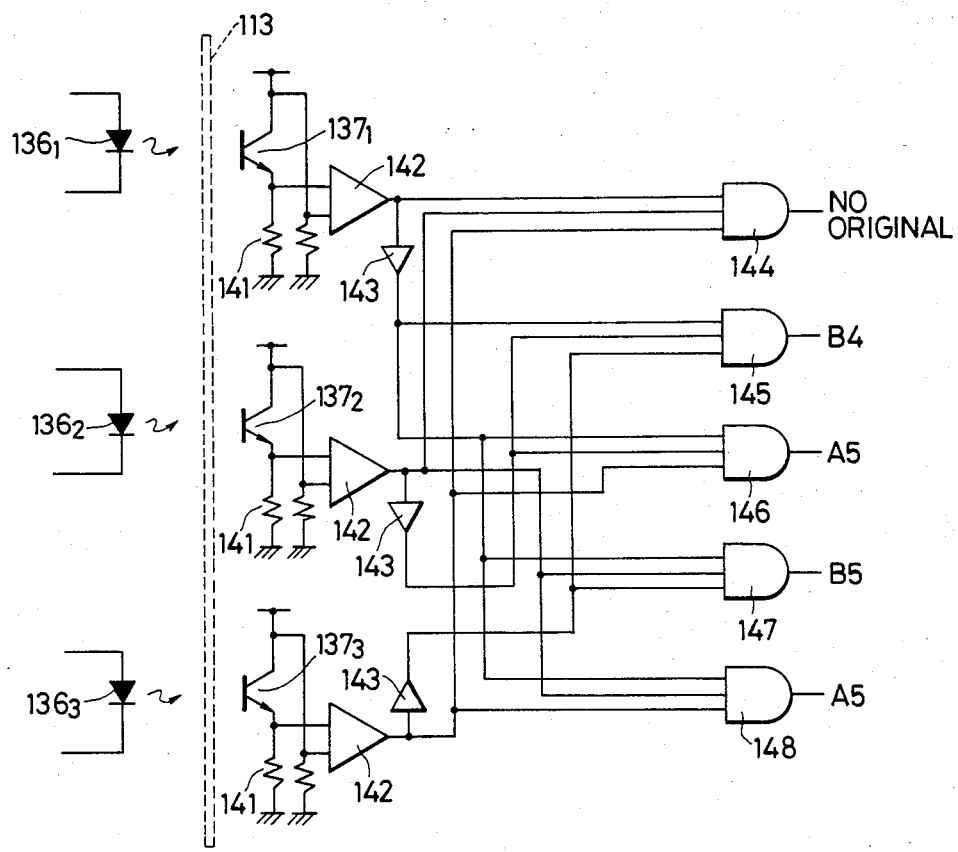
FIG. 4 is a circuit diagram showing a logic circuit of the copying machine.

FIG. 4 shows a logic circuit 140 which determines or identifies an original according to whether or not the several photo-diodes detect light. The emitter of each of the photo-diodes $137_1$ through $137_3$ is connected to a resistor 141 which provides a potential difference when light is detected, and to a comparator in which this potential difference is compared with a reference voltage. The outputs of the comparators 142 are applied directly or through inverters to the input terminals of first through fifth AND circuits 144 through 148 according to the logic in the above-described Table. As a result, for instance, the first AND circuit 144, to which the outputs of the three comparatos, 143 are applied as they are, outputs an "H" (high) level signal only when no original is placed on the platen. Similarly, the second AND circuit 145 outputs an "H" level signal only when an original of size "B4" is placed thereon, the third AND circuit 146 outputs an "H" level signal only when an original of size "A4" is placed thereon, the fourth AND circuit 147 outputs an "H" level signal only when a "B5" size original is placed thereon, and the fifth AND circuit 148 outputs an "H" level signal only when an "A5" size original is placed on the platen.

Figure 5:
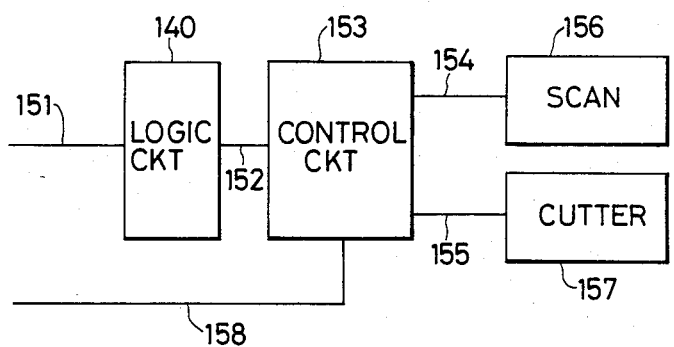
FIG. 5 is a block diagram showing the control operation of the copying machine.

The above-described original size identifying operation of the logic circuit 140 is carried out immediately after a start signal 151 for starting a copying operation is applied to the logic circuit 140 as shown in FIG. 5. As a result, the logic circuit 140 outputs an original identification signal 152, which is supplied to a control circuit 153 adapted to perform a control operation according to the original size. The control circuit 153 includes two types of counters for counting a clock signal. The control circuit 153 starts counting the clock signal upon reception of the original identifying signal 152. When a value corresponding to the size of a particular original is counted, the control circuit outputs a scan completion signal 154 and a cutter operation signal.

The scan completion signal 154 is supplied to a motor drive circuit 156. The motor drive circuit 156 operates to supply a drive pulse to the platen drive motor 102 (FIG. 1). Upon reception of the scan completion signal 154, the circuit 156 inverts the polarity of the drive pulse, so that the forward movement of the platen 109 is changed to backward movement. Accordingly, unnecessary scanning such that the original is scanned over a distance greater than its length is eliminated. Thus, the platen is quickly returned to its start position.

On the other hand, the cutter operation signal 155 is applied to an automatic cutter drive circuit 157. The circuit 157 supplies electric power to the automatic cutter 133 with this timing, so that the cutter 133 cuts the heat-sensitive sheet 125. In this position, the heat-sensitive sheet 125 is cut to the length, in the auxiliary scanning direction, of the original. When the original identification signal 152 supplied to the control circuit 153 represents the fact that no original is set on the platen, an original set lamp on a control panel (not shown) is turned on. It goes without saying that, in this case, the series of recording operations including the platen scanning operation is not started.

Figure 6:
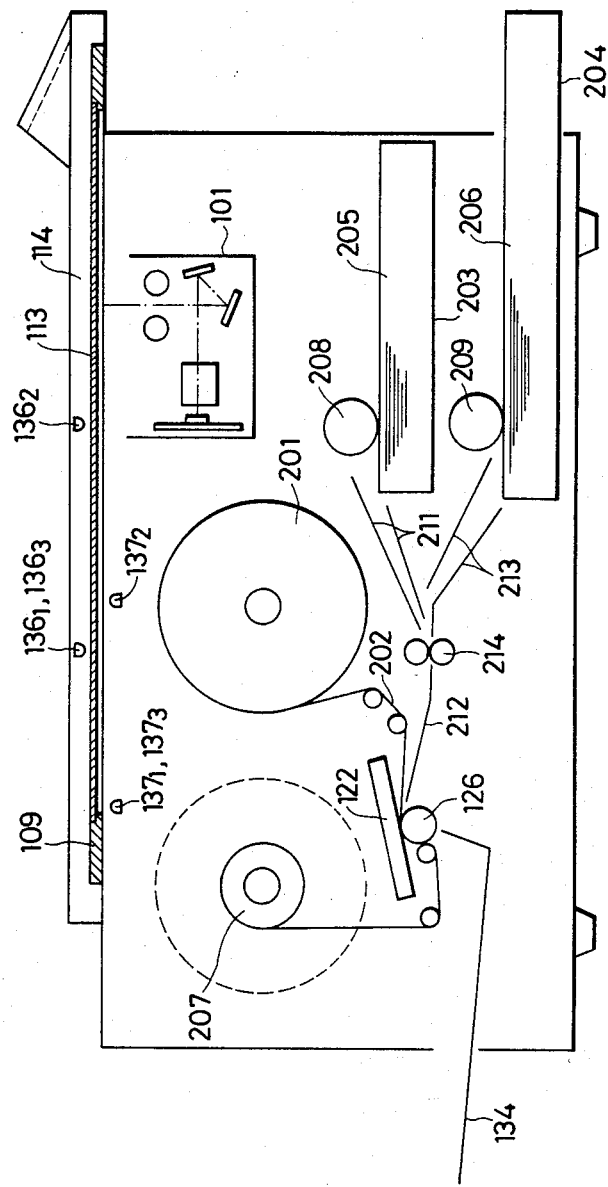
FIG. 6 is a side view outlining the arrangement of the elements in one modification of the copying machine according to the invention.

FIG. 6 shows one modification of the copying machine according to the invention, which supplies recording sheets (or cut sheets) of different size. In FIGS. 6 and 1, like parts are designated by like reference numerals. This copying machine is designed so as to record pictures or images according to a thermal transfer type recording system. An ink donor sheet 202 supplied from a supply roll 201 is laid on a recording sheet 205 or 206 which is selectively supplied from a first or second supply tray 203 or 204, and the sheets thus arranged are run between the thermal head 122 and the back roll 126. In this operation, the ink on that part of the ink donor sheet 202 which has been heated by the thermal head 122 is fluidized or sublimated so as to be transferred onto the recording sheet 205 or 206. Thereafter, the recording sheet 205 or 206 is separated from the ink donor sheet 202, and is delivered to the discharge tray 134. The used part of the ink donor sheet 202 is wound on a winding roll 207.

Similarly as in the first described embodiment, light emitting diodes $136_1$ through $136_3$ and photo-diodes $137_1$ through $137_3$ are physically arranged so that the size of an original is identified by the logic circuit (not shown). The feed roll 208 of the first supply tray 203 or the feed roll 209 of the second supply tray 204 is driven according to an original size as detected by the logic circuit. In the case when the first feed roll 208 is driven, for instance, a size "A4" recording sheet 205 is supplied to the thermal head 122 while being guided by first and second guides 211 and 212. In the case when the second feed roll 209 is driven, for instance, a size "B4" recording sheet 206 is supplied to the thermal head 122 while being guided by a third guide 213 and the second guide 212. Registering rolls 214 for registering the recording starting position are provided in the sheet supplying parts. It goes without saying that the amount of movement of the platen 109 can be adjusted according to the selected recording sheet.

As is apparent from the above description, according to the invention, the operation of the reading system and the recording sheet selecting operation are controlled according to the detected size of an original. This can prevent the occurrence of inefficient copying machine operation where no original is set. In addition, when the length of an original is short, the scanning width of the reading system can be reduced, which makes it possible to increase the number of sheets copied per unit time.

In the above-described copying machine, the platen reciprocates 109 to move relative to the fixed reading unit 101. However, it goes without saying that the technical concept of the invention can be equally applied to a copying machine of the type where the platen is stationary and the reading unit reciprocates.

What is claimed is:

1. A copying machine, comprising:

a transparent platen for the placement of an original;

a platen cover for holding said original on said platen;

sensors for detecting, at positions corresponding to predetermined points on said platen, whether or not light is transmitted between said platen and said platen cover;

logic means for identifying the size of said original on said platen from the outputs of said sensors;

scanning control means for determining a scanning size for said original according to a size identification result provided by said logic means; and recording sheet size control means for determining a cutting position of an elongated recording sheet according to said size identification result.

2. A copying machine, comprising:

a transparent platen for the placement of an original;

a platen cover for holding said original on said platen;

sensors for detecting, at positions corresponding to predetermined points on said platen, whether or not light is transmitted between said platen and said platen cover;

logic means for identifying the size of said original on said platen from the outputs of said sensors;

recording sheet size control means for selectively supplying recording sheets which have been cut to said identified size according to a size identification result provided by said logic means; and recording sheet size control means for determining a cutting position of an elongated recording sheet according to said size identification result.

3. An apparatus as claimed in claim 1, said sensors comprising photosensor means.

4. An apparatus as claimed in claim 1, said logic means comprising comparator means associated with each of said sensors.

5. An apparatus as claimed in claim 4, said logic means further including a plurality of AND means receiving outputs of said comparators, and being connected to said comparators so as to selectively detect the presence of an original of one of a plurlity of predetermined sizes of the absence of any predetermined size.

6. An apparatus as claimed in claim 5, said scanning width control means preventing scanning upon the detection of the absence of an original on said platen.

7. An apparatus as claimed in claim 2, said sensors comprising photosensor means.

8. An apparatus as claimed in claim 2, said logic means comprising comparator means associated with each of said sensors.

9. An apparatus as claimed in claim 8, said logic means further including a plurality of AND means receiving outputs of said comparators, and being connected to said comparators so as to selectively detect the presence of an original of one of a plurality of predetermined sizes or the absence of any predetermined size.

* * * * *